United States Patent [19]

Reed et al.

[11] Patent Number: 5,574,466
[45] Date of Patent: Nov. 12, 1996

[54] METHOD FOR WIRELESS COMMUNICATION SYSTEM PLANNING

[75] Inventors: John D. Reed, Arlington; Yuqiang Tang, Plano, both of Tex.

[73] Assignee: Motorola, Inc., Schaumburg, Ill.

[21] Appl. No.: 452,799

[22] Filed: May 30, 1995

Related U.S. Application Data

[63] Continuation-in-part of Ser. No. 415,051, Mar. 31, 1995.
[51] Int. Cl.$^6$ ....................................... G01S 1/00
[52] U.S. Cl. .................. 342/359; 455/277.1; 455/277.2; 343/703; 342/350
[58] Field of Search ............................ 343/703; 342/360, 342/173, 350, 359; 455/277.1, 277.2

[56] References Cited

U.S. PATENT DOCUMENTS

| | | | |
|---|---|---|---|
| 4,704,734 | 11/1987 | Menich et al. | 455/33 |
| 4,978,962 | 12/1990 | Hisada et al. | 342/351 |
| 5,313,660 | 5/1994 | Lindemeier et al. | 455/135 |
| 5,335,010 | 8/1994 | Lindemeier et al. | 348/706 |
| 5,396,255 | 3/1995 | Durkota et al. | 342/360 |

OTHER PUBLICATIONS

Henry L. Bertoni, Fellow, IEEE, Walter Honcharenko, Member, IEEE, Leandro Rocha Maciel, and Howard H. Xia, "UHF Propagation Prediction for Wireless Personal Communications", Proceedings of the IEEE, Sep. 1994, pp. 1333–1359.

Jorgen Bach Andersen, Theodore S. Rappaport, and Susumu Yoshida, "Propagation Measurements and Models for Wireless Communications Channels", IEEE Communications, Jan. 1995 vol. 33 No. 1 pp. 42–49.

Primary Examiner—Gilberto Barrón, Jr.
Assistant Examiner—Dao L. Phan
Attorney, Agent, or Firm—Richard A. Sonnentag

[57] ABSTRACT

A method for wireless communication system planning includes, in a first embodiment, determining an image tree (500), based on a transmitter location (401) and the reflective (415) and diffractive (425) surfaces within a coverage region, and limiting the image tree to exclude branching for higher order images requiring more than a predetermined number of reflections and/or diffractions, or potential child images corresponding to surfaces not within the scope of the parent image (530, 560). Based on the image tree and propagation path back-tracing (620) a received signal quality measure (e.g., power) is determined for each transmit location. By comparing the different received signal powers an optimal receiver unit location is determined. Further, by back-tracing for further antenna locations/combinations, and comparing for diversity effects (864, 865), overall coverage qualities can be determined for each antenna combination and compared to yield optimal base diversity antenna locations (867).

14 Claims, 8 Drawing Sheets

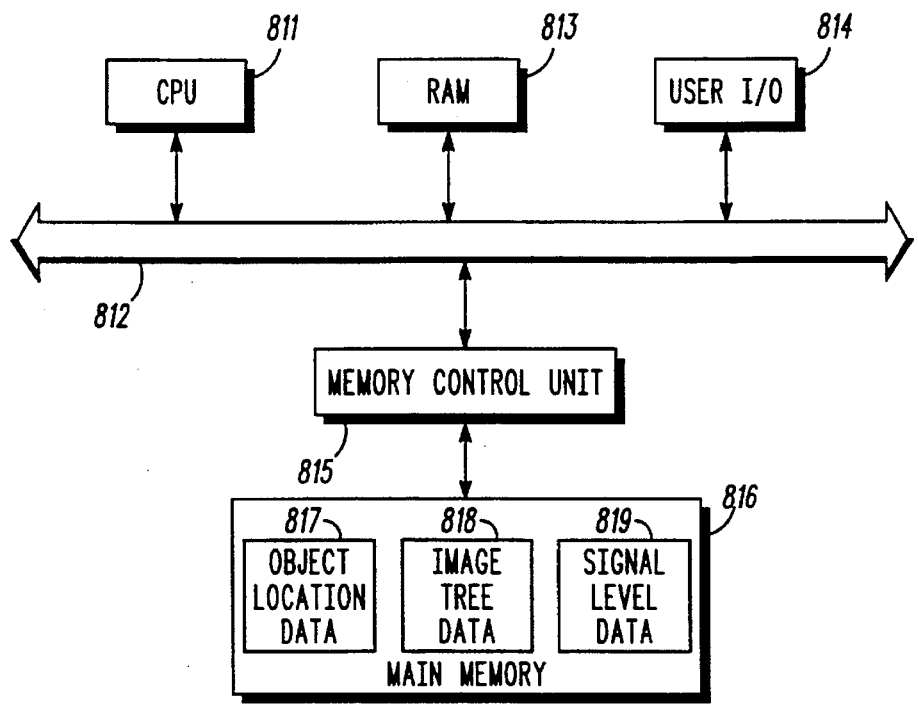
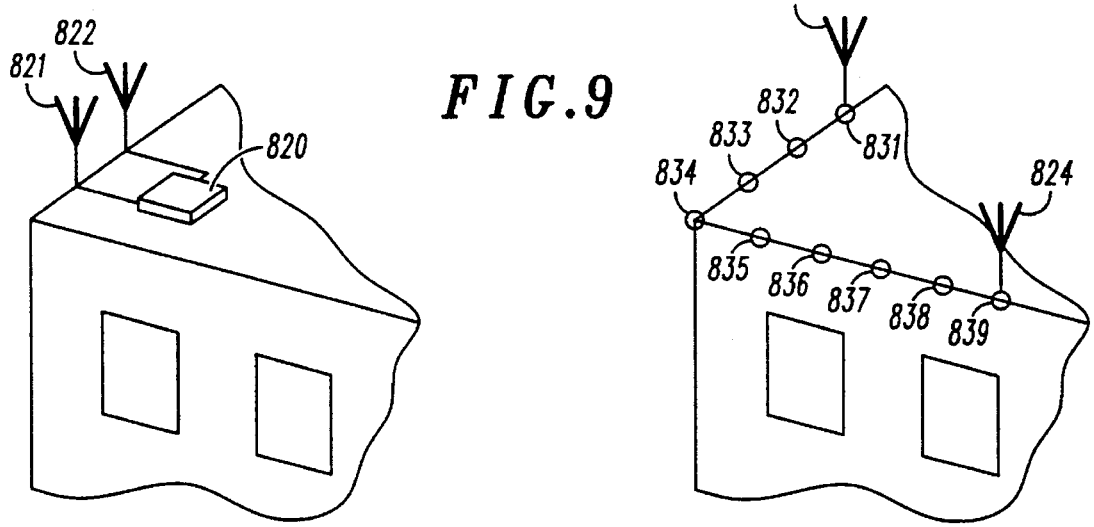

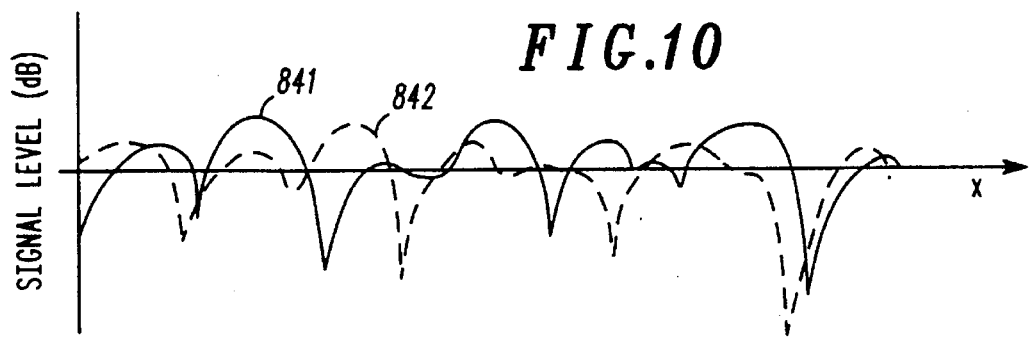
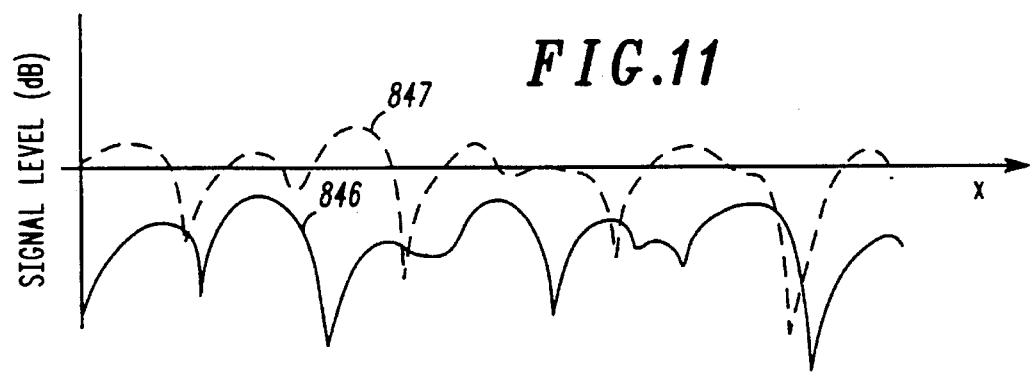
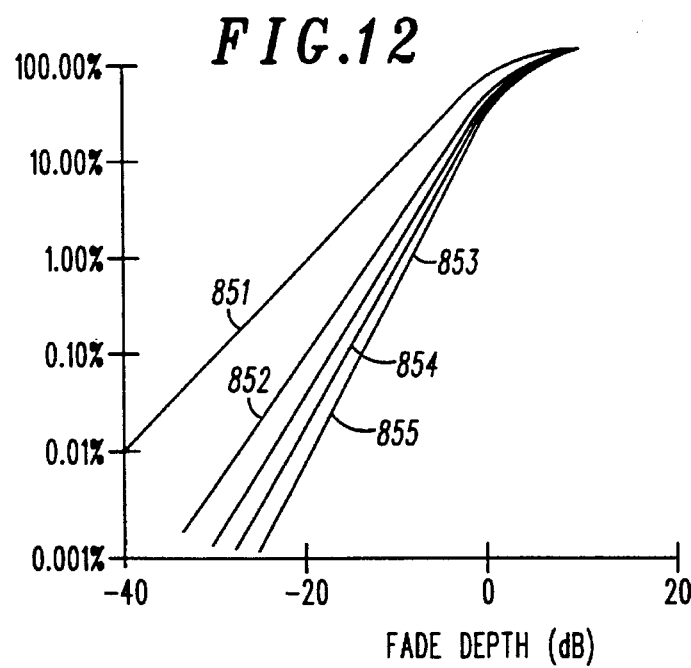

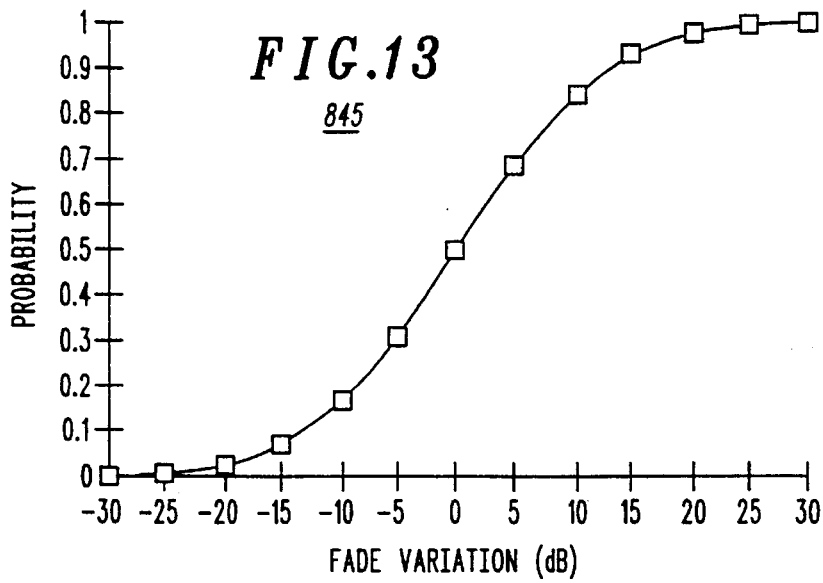
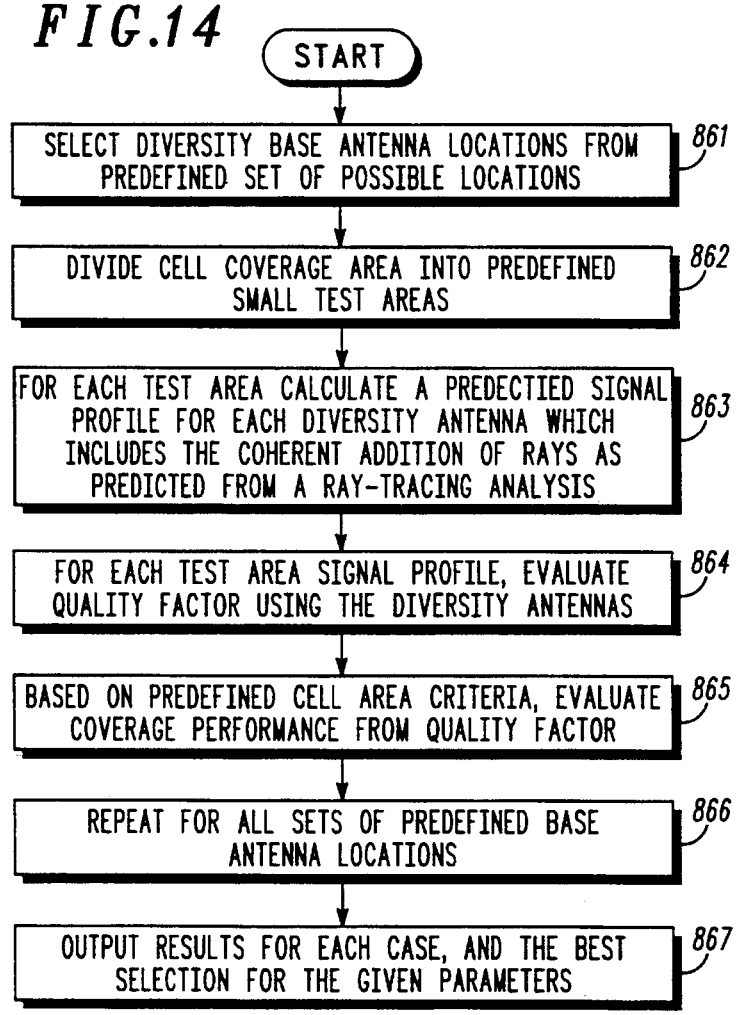

METHOD FOR WIRELESS COMMUNICATION SYSTEM PLANNING

RELATED APPLICATIONS

The present application is continuation in part of U.S. patent application Ser. No. 08/415,051, to Tang et al., filed Mar. 31, 1995.

FIELD OF THE INVENTION

The present invention relates, in general, to wireless communication systems and, more particularly, to a method for wireless communication system planning using ray-tracing.

BACKGROUND OF THE INVENTION

In a wireless communication system such as cellular or Personal Communications Services, base stations are located such that radio signals are available through out the service area. To obtain near seamless coverage, many cells are required. Predicting the coverage of such cells is a difficult job, and a number of tools have been developed which make some use of terrain data, with building clutter information, such as that available by the US Geological Survey within the United States. This data is used in conjunction with models that are well known in the art, such as the Longley-Rice model which uses base and subscriber heights, along with a description of the terrain to calculate a prediction of the expected propagation loss for the locations under consideration.

This method works sufficiently well for large cells whose base antenna is well above the building clutter, so the influence of particular buildings/structures or groups of buildings is minimal. When the base station antennas are near rooftop level or below building rooftops, then the actual size and shape of the buildings influences the signals as they propagate down the streets and diffract around corners. These cells, generally called microcells, typically cover a much smaller area, especially in dense urban areas. Tools to predict micro-cell coverage typically use information about the building sizes, shapes, and sometimes material types to aid in modeling the propagation paths in and around the buildings in the coverage area.

A deterministic process, as opposed to the above statistical process, basically attempts to model the radiowave propagation as rays radiating from the transmitter to the receiver. This approach can be effective and accurate when the objects in the modeled environment are much larger in dimension than the wave length of the transmitted signal. The propagation phenomena that can be modeled in a ray-tracing process include reflection, diffraction, transmission and the combinations of the above. Within ray tracing there are two generally known approaches. The first is called the "shooting-and-bouncing" method, in which a fixed number of rays are launched from the source (transmitter), then forward-traced to follow the different propagation paths, with a ray being terminated when it hits a detection sphere at the receiver. A major advantage of this approach is that it can be applied to most any type of surface. A key disadvantage is that for every receiver location, the rays have to be launched and traced again in all directions. This could mean hours or even days of computation time for a practical environment.

The second method is based on image theory, which is traditionally limited to more or less planar surfaces in the environment. The basic notion here is that the images of a source at a fixed location in a given environment are independent of the location of the point of observation (receiver) as long as there are basically planar surfaces in the environment. Therefore one can build all the images for a given location of the source and environment and reuse it for as many receiver locations as one needs. This represents an improvement in terms of computational efficiency, but of course, one is limited by the planar surfaces in the environment. This is, however, typical of an urban microcellular environment. Thus, a conventional image theory approach may be advantageously used for microcells, with one first determining an image tree (hierarchically organized for ease of use) based on the location of the source in the environment and the environment itself. The environment consists of mirrors (or reflective surfaces) and corners. Starting from the source image, each mirror or corner has the potential of generating a "child" image from the source image. Each child image can further generate child images for every mirror and every corner. Once the image tree is built, for a given receiver location every image on the tree needs to be examined to see whether it contributes to the total received power through a back-tracing process from the receiver to the transmitter.

However, a key problem with image tracing is the size of the image tree for a realistic environment, leading to very large computational and memory requirements. The following example illustrates the problem. In an environment defined by N mirrors, there are also (typically) approximately N corners. Each of the N mirrors can potentially generate a reflective image, and each of the N corners can potentially generate a diffractive image. Without some limitation on the growth of the image tree, a source with m levels of reflection and n levels of diffraction will generate on the order of $(2N)^n N^{(m-n)}$ images, assuming m>n. For example, if N=100, m=3, n=1, then a conventional image tree will include about 2,000,000 images. If each image object takes 100 bytes of memory (i.e., in order to hold its own attributes and pointers to its ancestor image and descendant images), the total memory needed to hold the above image tree with fairly modest assumptions is 200 megabytes! Given the number of images involved, it is typical for the process of determining transmitter/receiver placements to take days or even weeks, depending on the number of buildings or other structures, the size of the coverage area, and the resolution of the calculated grid of predicted points.

Because of the large computational requirements in prior ray tracing approaches, no attempt has been made to use calculated results in determining optimal placement of anything more than single antenna sites. However, most base stations employ more than one antenna, typically to compensate for short or Rayleigh fading over the communication channel via diversity. By only determining placement based on uniform propagation from a single antenna, without consideration of possible improvements of micro-diversity (e.g., placement to compensate for Rayleigh fading) or macro-diversity (e.g., placement to compensate for log normal fading), possible adjustments in the variations in the placement of diversity antennas is foregone.

There remains therefore a need for an improved method of ray tracing which compensates for these and other problems, including providing a computationally efficient method for ray tracing, and using propagation estimates from ray tracing to optimize antenna placement.

BRIEF DESCRIPTION OF THE DRAWINGS

FIG. 8 is a simplified block diagram of a processor on which the embodiment of the invention can be practiced;

FIG. 9 is a diagram illustrating possible antenna mounting locations at a base station;

FIG. 10 is a diagram illustrating representations of two independent Rayleigh faded signals with approximately equal average power;

FIG. 11 is a diagram illustrating representations of the same two independent Rayleigh faded signals of FIG. 10 but with branch imbalance, i.e. one branch has lower average power;

FIG. 12 is a diagram illustrating representations of a cumulative distribution of a Rayleigh faded signal which includes the cases of selection diversity with different branch imbalances;

FIG. 13 is a diagram illustrating a representation of a cumulative Log Normal distribution in which the Log Normal sigma is 10 dB, a value representative of the shadow fading characteristic of urban microcells; and FIG. 14 is a flow chart of a process for selecting optimal diversity antenna locations according to a preferred embodiment of the invention.

DETAILED DESCRIPTION OF THE DRAWINGS

Figure 1:
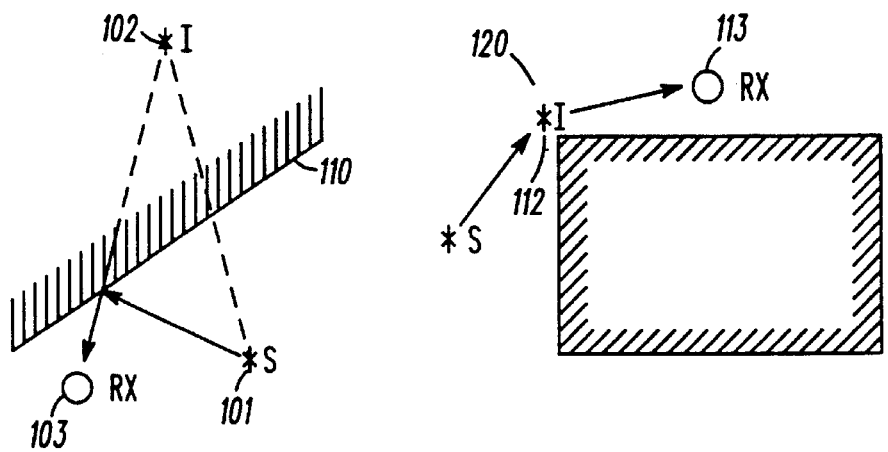
FIG. 1 is a diagram illustrating how a reflective image is generated for a reflective surface of "mirror," and how a diffractive image is generated for a diffractive surface or "corner," in accordance with a preferred embodiment of the invention.

These and other problems are solved by the method for system planning in accordance with the invention. This method, described further below, is particularly advantageous since most conventional ray tracing processes use image trees consisting of large numbers of unenergized images. If one can determine whether an image is energized or not before generating that image, one can generate and store images for the energized portions only. Not only is memory saved; there is also a reduction in searching time consumed in later processing and placement determination. However, even with such "pruning" of the image tree, there are still a fairly large number of images on the image tree for a realistic urban environment (e.g., 50,000). To determine the received signal for a given receiver location, therefore an improved back-tracing process is preferably performed for every image on the image tree. By repeating this process for other receive locations, an estimate of the coverage quality for the given transmitter may be obtained, from which optimal transceiver placement can be determined. Further, where diversity reception is to be employed, a coherent reception of all rays at each of a series of possible antenna locations is performed, and a determination of the optimal antenna combination is then made. All this can be performed at significant savings in memory and processing time over prior methods due to the improvement of the present invention.

A preferred method for determining signal propagation characteristics for the known environment (e.g., microcell or in-building) starts with minimizing the size of (i.e., pruning) the image tree by defining a scope for each image on the image tree. A "scope" is defined as an angle within which the majority of the radiated energy from the image is confined. The source image, of course, has a predetermined scope angle-typically 360 degrees, but it could be a set lesser amount if directed (e.g., so as not to transmit towards an immediately adjacent wall, or for sectorized antennas). The scope angle of a reflective image, however, is usually much less than 180 degrees. Typically, the scope angle of a diffractive image is usually less than 45 degrees. When the image tree is built for a given environment and source location, a scope attribute is specified every time an new image is created. New images are only created for those mirrors and corners that fall within the scope of an image. By defining the scope angle and mapping out only the energized portion of the image tree, the size of the resultant image tree is greatly reduced. This in turn saves the memory needed to store the images, and increases the speed of computation for received power and other data.

Subsequently, the inherent information in the hierarchy of the image tree is preferably used to partially trace the image tree based on a received signal level (or similar propagation/ quality measure, including signal power loss). For any image on the image tree, its reflective child image contributes less power compared to the parent image due to the extra reflection. The difference can be 14 dB or more for realistic environments. On the other hand a diffracted child image typically contributes at least 6 dB less power than the parent image, and usually a lot less. Therefore by setting an absolute and a relative signal level threshold, the received signal level from the current image can be compared to the threshold and the current total received power, and decisions made whether or not to examine the child images of the current image. Thus, partial examination of the image tree for the computation of the summed signal level at a given location is accomplished. This reduces the time needed to calculate the signal power for each possible receiver location.

In a further embodiment, the computation of the summed signal is done for a predetermined frequency, allowing coherent addition of the various rays to form the summed signal level. The process is then repeated for additional candidate antenna locations. A set of summed diversity signal levels is then formed by calculating the signal level for a given diversity system (e.g., for 2 antenna selection, choosing the greatest summed signal level for each possible pairing of antennas). The outcome of the different candidate diversity placements are then compared to determine the optimal antenna placements.

Referring initially to FIG. 1, image generation is generally illustrated, showing how a reflective image 103 is generated on a mirror 110, and how a diffractive image 113 is generated on a corner 120. A source (s) 101 can create a reflective image (i) 102 behind the mirror 110, which defines the path of the reflected ray from the source to the receiver 103 if a receiver location is defined. Notice that the location of the image 102 is independent of the location of the receiver 103. A source (s) 111 can also create a diffractive image (i) 112 at a diffracting corner 120, which defines a diffracted path from the transmitter to the receiver 113 if the location of the receiver is defined. Again, the location of the diffractive image 112 is independent of the location of the receiver 113.

Figure 2:
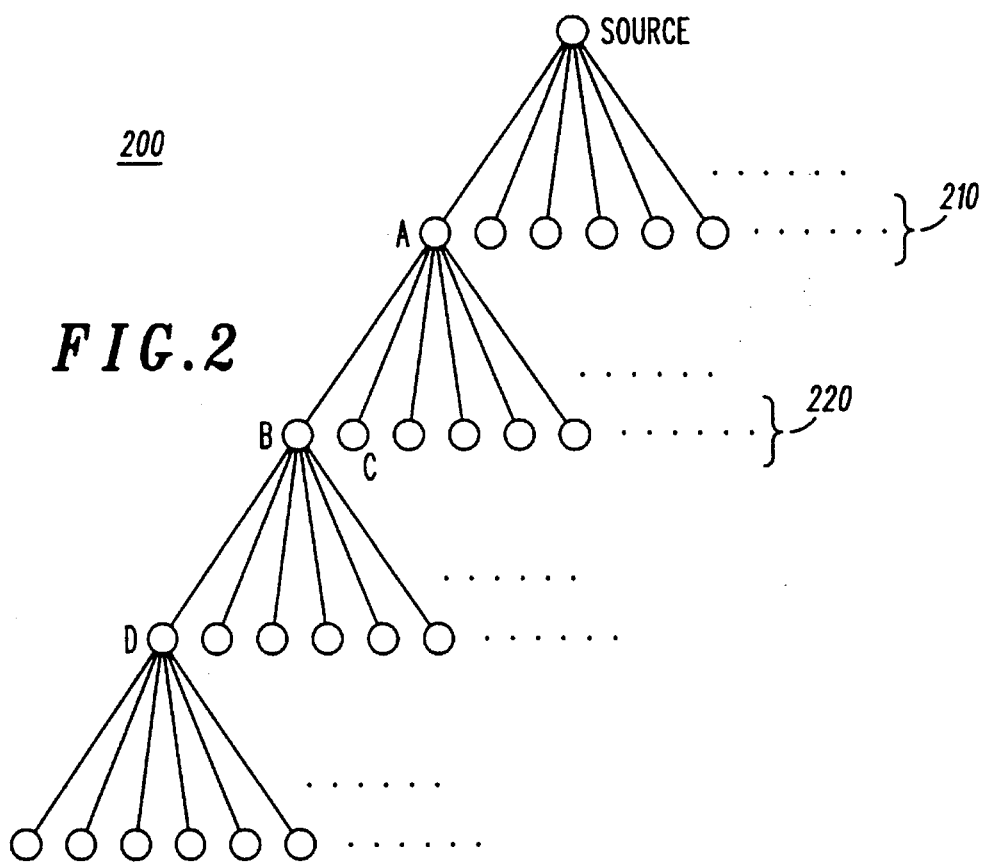
FIG. 2 is a diagram illustrating a hierarchical view of an image tree for a given environment and source.

FIG. 2, generally depicts the hierarchy of an image tree (generally designated 200). For a given environment and a given source location, the source 201 can generate for every mirror in the environment a reflected child image, and for every corner in the environment a diffractive image. These are called first generation (or first order) images 210. Each first generation image can in turn act like the source image and generate for every mirror in the environment a reflected child image, and for every corner in the environment a diffractive image. These are called second generation or second order images 220. This process can be repeated for second and higher order images and stopped after a predetermined number of reflections and diffractions is reached. The images generated in this process are then linked together to form a hierarchical image tree 200.

If the given transmitter TX is the head of the image tree, i.e. the source 201, and A is an image somewhere in the tree, whether reflective or diffractive, and if B is a reflective child of image A, then the power contribution from image B is less by an amount equal to the loss due to the reflection plus the extra free space loss below that from image A. For real environments this is at least 14 dB plus the difference in free space loss (determined based on the path segment length from a reflective/diffractive surface corresponding to image A and a reflective point on the surface corresponding to image B—e.g., the distance between r1 312 and r2 322 of FIG. 3). In the same way, if C is a diffractive image of A, then the power contribution of image C is a loss of at least 6 dB (usually much more than 6 dB) plus the difference in free space loss below that of image A. If the power contribution of image A is already below a given threshold, then there is no need to check B and C and their siblings and descendants, so the image tree can be further pruned.

Figure 3:
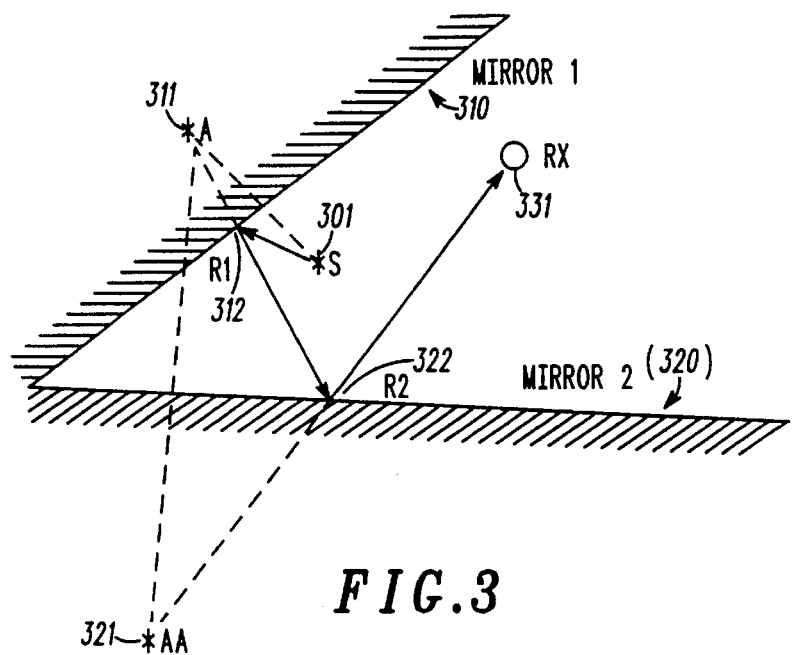
FIG. 3 is a diagram illustrating "back-tracing" of an image on the image tree from the receiver to the transmitter.

Turning to FIG. 3, "back-tracing" of an image is illustrated, i.e., tracing an image tree back from the receiver 331 to the transmitter 301. When the receiver's location is known, each of the images on the image tree may be examined to see whether it lies on a propagation path between the transmitter 301 and the receiver 331. This is done by back-tracing. Starting from the receiver (RX) 331, a propagation line is first drawn between the second generation image (aa) 321 and RX 331, from which a point of reflection (r2) 322 on the surface (mirror 320) is found. If r2 322 is not on mirror 320 or the line-of-sight (LOS) path between RX 331 and r2 322 is blocked, then this image does not constitute a possible propagation path. Otherwise a line or ray is drawn between r2 322 and (a), which is the parent image 311 of the image aa 321. Another point of reflection (r1) 312 on surface 310 is then found. Again, if (r1) 312 is not on mirror 310 or the LOS path between (r2) 322 and (r1) 312 is blocked, then this image 311 does not constitute a valid propagation path. If the LOS clearance between (r1) 312 and the source (s) 301 (which is the parent image of the image a 311) exists, then there is a propagation path from the source 301 to the receiver RX 331 through two reflection points 312, 322.

Figure 4:
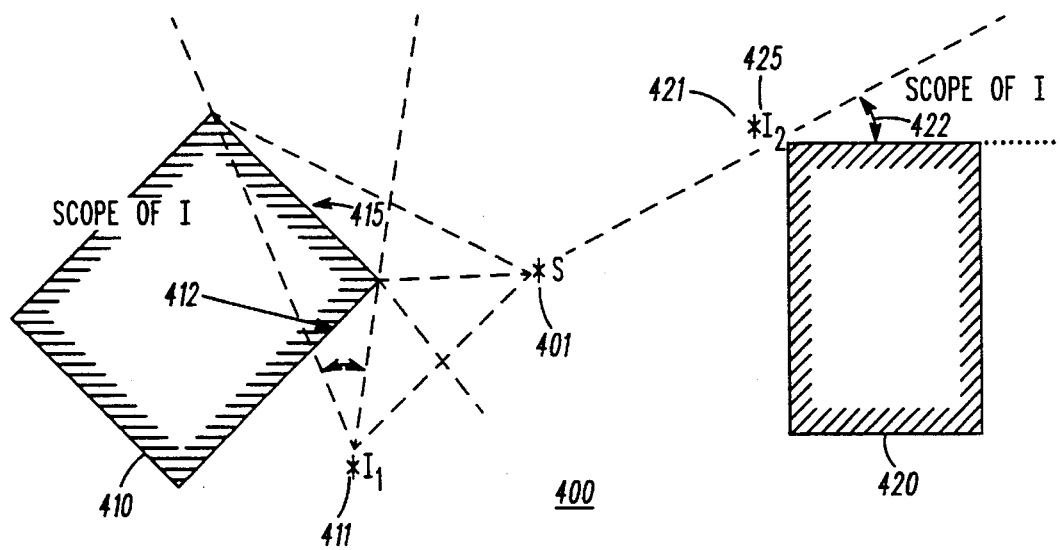
FIG. 4 is a diagram illustrating the use of a scope for both a reflective image and a diffractive image in accordance with the preferred embodiment of the invention.

FIG. 4 generally depicts how a scope can be used in building an image tree in an urban canyon 400. The scope is an angle that defines the energized region of space based on possible propagations from the image. In the case of building 410 having surface 415 (which acts as a mirror in this case), image $i_1$ 411 is the image for any reflections off surface 415 from transmitter source location 401. However, since image $i_1$ 411 can only serve as an image for those rays propagating from surface 415 within the region defined by the scope 412, scope 412 can be used to significantly reduce the possible daughter images of image $i_1$ 411 (i.e., to those images having reflection or diffraction points within the region defined by scope 412). Similarly, in the case of building 420 having surface edge 425 (which acts as a diffraction corner), image $i_2$ 421 is the image for any diffractions off surface 425 from source 401. However, again the image $i_2$ 421 can only serve as an image for those rays propagating from edge 425 within the region defined by the scope 422, and scope 422 can be similarly used to significantly reduce the possible daughter images of image $i_2$ 421 (i.e., to those images having reflection or diffraction points within the region defined by scope 422). In both cases, the scope angles of reflected and diffractive images are much smaller than 360 degrees, which would conventionally be required for the two dimensional case. By only creating child images for surfaces (e.g., mirrors and corners) that are within the scope of the current image, the growth of the image tree will be limited within the energized portion of the potential image tree. This will effectively "prune" the image tree to a manageable size for a realistic environment such as urban microcellular applications.

Figure 5:
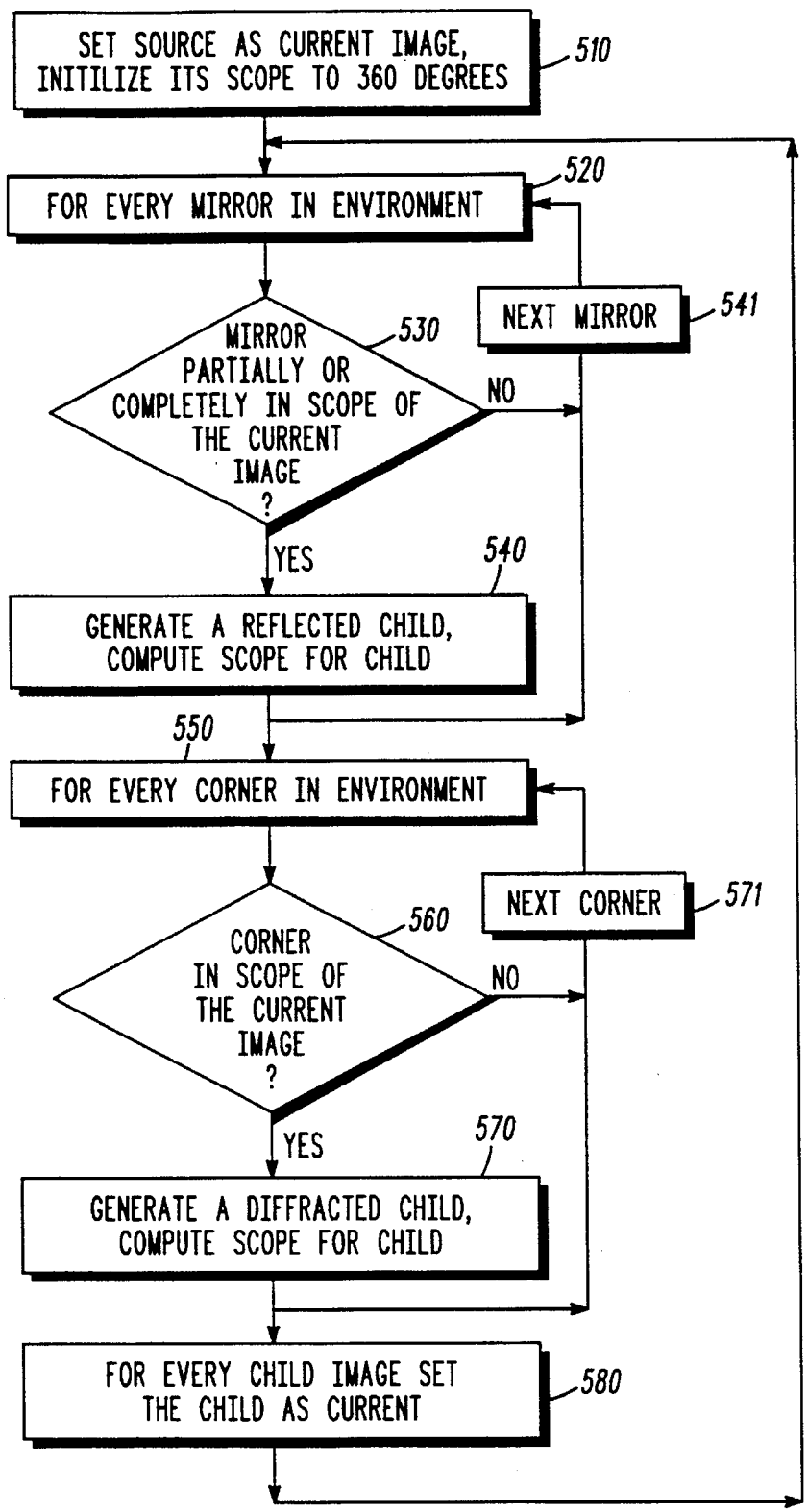
FIG. 5 is a flow diagram illustrating a method for determining an image tree in accordance with the preferred embodiment of the invention.

Next, FIG. 5 generally illustrates a method 500 by which a pruned image tree can be built. First, if it has not already been determined, the location of all significant structures (buildings, towers, terrain, etc.) and any desired structural characteristics (e.g., the location of each of plural reflective surfaces (defining all potential reflective points on the surface) and plural diffractive surfaces, along with signal power loss characteristics) are determined. Then, for a given transmitter source location and known environment (i.e., the structural characteristics, the source is set as the current image, and its predetermined scope set (typically to 360 degrees)) (step 510). Then, for every "mirror" that is in the environment (step 520) a determination is made whether the mirror is partially or completely in the scope (e.g., unobstructed LOS view) of the current image (step 530). If it is, a child image (or first order reflective image) is determined (step 540) (via conventional trigonometry) for that mirror and the scope computed. Next, for every "corner" in the environment (550) a determination is made whether the corner is in the scope of the current image (step 560). If it is, a child image (or first order diffractive image) is determined for that corner and the scope computed (step 570). Finally, the process is repeated for a predetermined number of reflections and diffractions for each branch. For example, if two levels of reflections and three levels of diffractions are desired, the image tree would be five levels deep at that branch; however, all third level reflective images (and their child images), even if third order images, would be pruned. In less dense urban environments, where there will be greater energy loss per reflection/diffraction due to, among other factors, longer paths, determination of two levels of reflection and three levels of diffraction are generally sufficient to adequately model the actual propagation environment. In denser environments an additional level, or perhaps even more, may be necessary. One skilled in the art will appreciate how to choose an appropriate level of image generation based on the environmental density, as well as considerations such as the available memory/processing power (which increase dramatically as each additional level is added).

Figure 6:
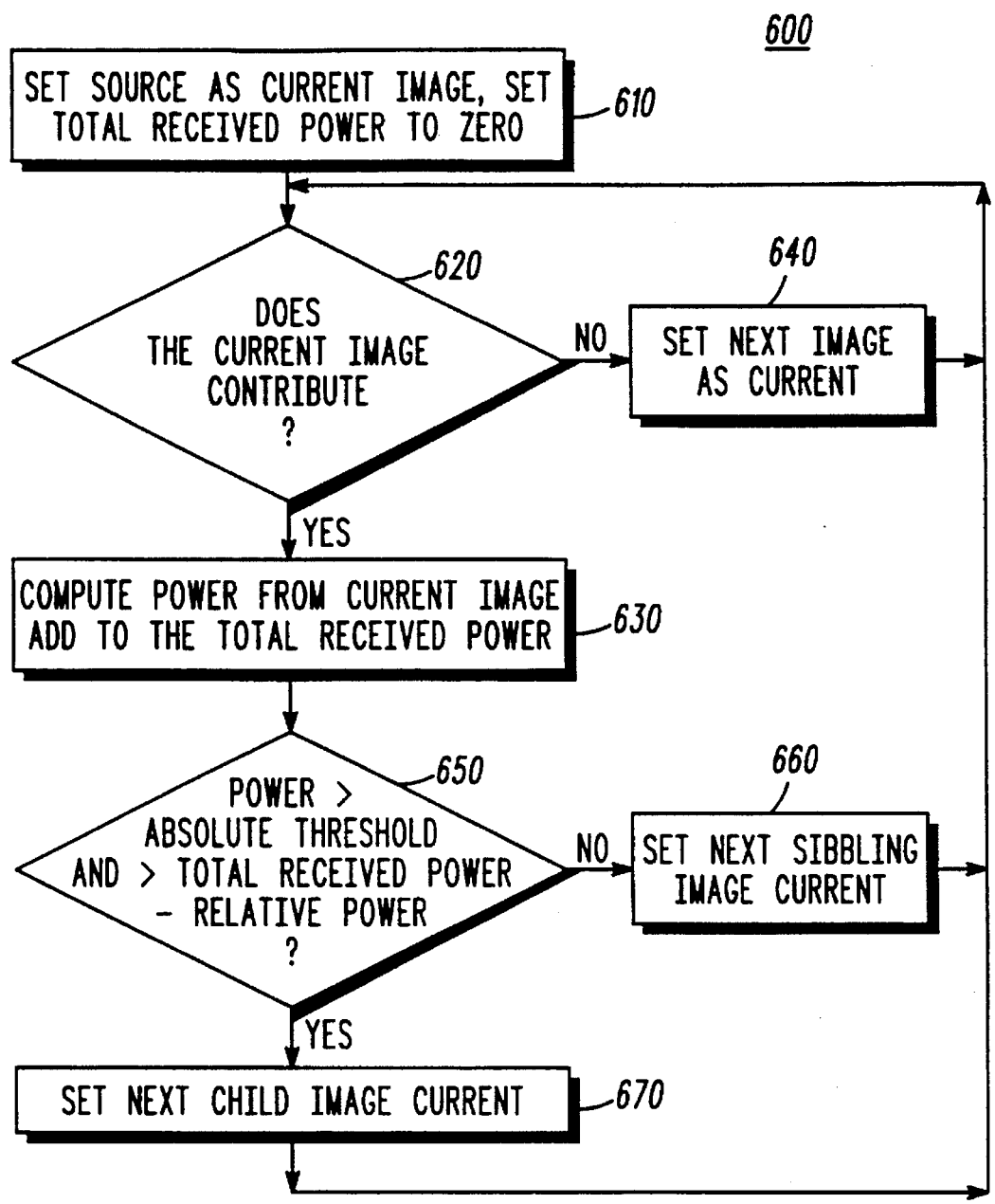
FIG. 6 is a flow diagram illustrating a method for received power estimation in accordance with the preferred embodiment of the invention.

Finally, FIG. 6 generally illustrates a preferred method (600) for back-tracing the images on the image tree and determining a received signal quality measure (e.g., the total received power, propagation loss, etc.) for given receiver locations. First, the process is initialized by starting with the top of the image tree, the transmitter (610). A back-tracing process (such as illustrated in FIG. 3) is performed to determine whether the first receiver location is in a direct line of sight with the transmitter (620). If it is, the path from the transmitter to the receiver forms a first propagation path, and the signal quality change (e.g., power loss, attenuation, or change in another quality measure) across the path, in this case due solely to free space path loss, is determined (630). If not, the next image, preferably in descending order on the image tree, is set as a current image (640).

Thus, following the transmitter the contribution of child image A (of FIG. 2) would be determined (620). If image A is a diffractive image, this would be determined as for the transmitter, i.e., whether a direct line of sight between the image (which is co-located with the diffractive surface) and the receiver exists. If image A is a reflective image, step 620 determines whether the line defined by image A and the receiver is unobstructed between the reflective surface of image A and the receiver (the intersection of this line and the reflective surface defining the reflective point) and whether the line from the reflective point to the transmitter is unobstructed—in other words, whether a propagation path exists using image A. If there is a propagation path, a power loss estimation is performed by determining each contribution—i.e., the free space loss across the two path segment lengths and a reflective surface loss. The reflective surface loss may be defined as a set value for all reflective surfaces (e.g., 14 decibels) for simpler calculations; alternatively, where known the reflective characteristics of the materials/structure of each reflective surface may be used, even including an angular factor for certain rough/irregular surfaces, so that a more precise power loss estimation may be obtained. Similar diffractive characteristics may by used, along with the angle of diffraction, in calculating power loss around diffractive surfaces.

Following step 630, a comparison is made between the power contribution (e.g., initial transmit power times power loss) of the current propagation path and a predetermined threshold. The threshold is preferably set low enough (e.g., a 120 dB drop from the transmit power) to exclude de minimus contributions. If the power contribution of, say image B of FIG. 2, were less than the threshold, no determination of the contribution of its child images (e.g., image D) would be made, since such would necessarily be de minimus too. In this case, the next sibling or same-order image would be set as the current image (e.g., image C) (step 660), and the process repeated. Additionally, the power contribution is also preferably compared against the difference between the cumulative power contributions already determined and a relative threshold (e.g., 20 dB) to exclude de minimus relative contributions; this is useful, e.g., in excluding contributions above the first threshold but still de minimus when short propagation paths with little loss are also present. If the power contribution is greater than both thresholds, then a determination of the contribution of each child/lower order image is then made (670).

This process is repeated (steps 541, 571) until all images on the tree have been examined or excluded by a threshold determination, yielding a received signal quality measure (e.g., received power) cumulated during step 630.

This process is then repeated for all predetermined receiver locations, yielding an estimate of the signal propagation characteristics within the predetermined region of interest of the given transmitter. The region of interest for microcellular systems will be defined typically as all regions within a predetermined radius of the transmitter location that are external to the structures within the region (internal calculations could also be performed, but would require more complex calculations involving power loss based on penetration characteristics). For in-building systems, the region of interest would be limited by the building boundaries. One skilled in the art will appreciate that the accuracy of the signal propagation characteristics is dependent on the number/distance between receiver locations, and how to select an appropriate number based on a balance between factors such as the accuracy desired and the computational capacity/time available. In both cases, the signal power for each receiver site can be used in a variety of ways to determine system planning, for example by factoring together for some overall measure of coverage quality, outputting the receiver locations and powers below a desired received signal level (indicating shadowing or cell boundaries), and displayed for a user so as to show relative receiver powers.

Figure 7:
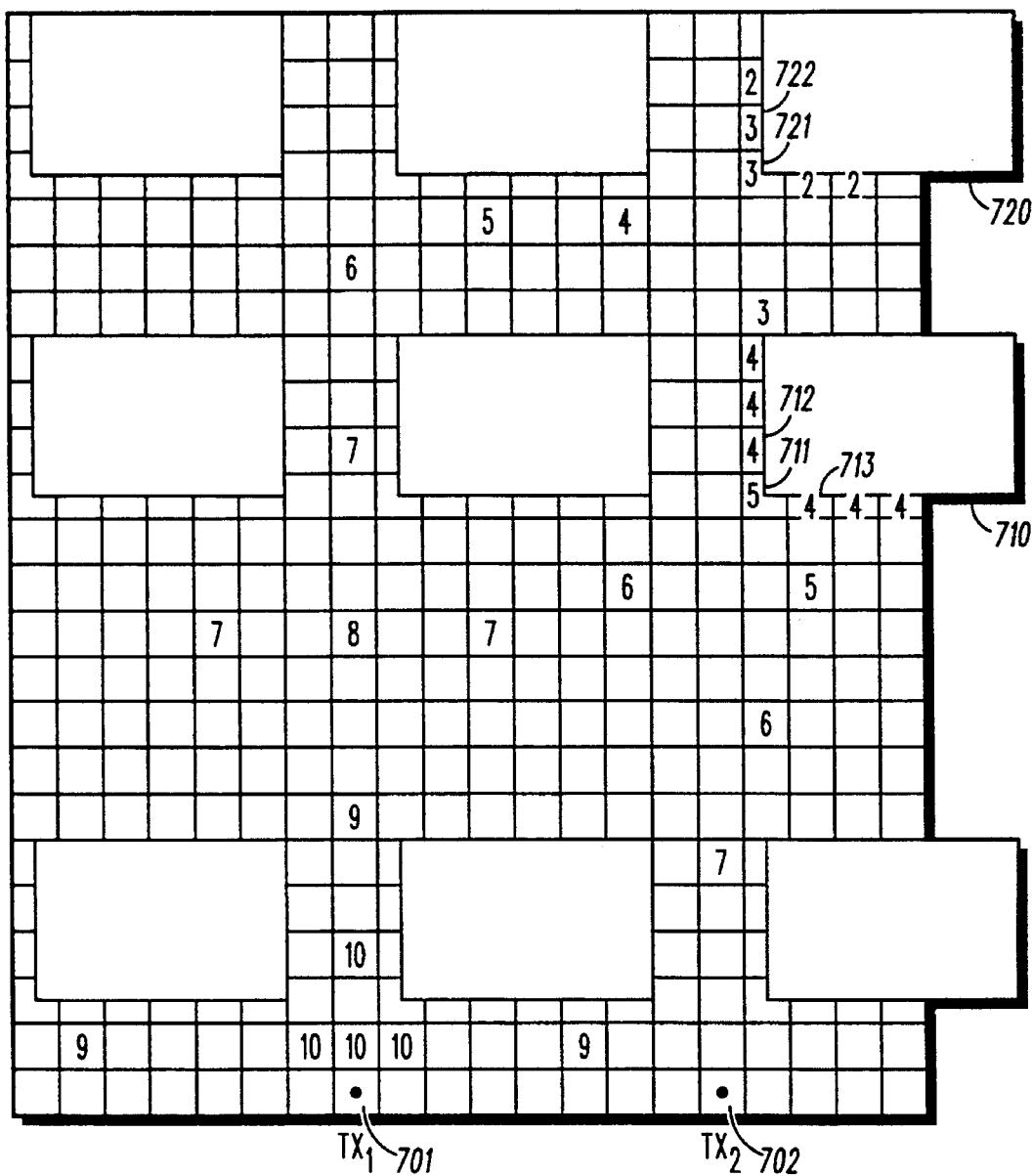
FIG. 7 is a diagram illustrating a plot of received signal powers for a coverage area in accordance with the preferred embodiment of the invention.

This latter approach may be advantageously used in determining the placement for a receiver, such as a wireless fixed access unit (WAFU) for use in PCS (personal communication services) systems. This is illustrated in FIG. 7, where one transmitter location 701 is used to cover a local region 700 such as a residential neighborhood with plural houses 710, 720. Relative received powers is determined for different possible receiver locations, illustrated by areas 711–713 and 721–722. The size of such areas may vary depending on the placement accuracy desired. Further, for ease of determination only relative power levels are displayed (in this case on a scale of 1 to 10, although any scale could be used, including color coding on a computer display). This is sufficient to determine the placement of a WAFU in area 711 adjacent building 710. In cases where the relative display does not provide enough detail, such as for areas 721 and 722 adjacent building 720, which both show a relative power of 3, the actual determined received signal powers in both areas can be displayed so the optimal area can be selected. Finally, where multiple transmitter source locations are possible, e.g., site 702, the entire process can be repeated to determine the receive powers throughout the coverage area based on use of the second transmitter location 702. The results may be compared in a variety of ways, two such being either comparing the coverage for known receiver/subscriber locations (e.g., if only buildings 710 and 720 were likely subscribers, TX 702 would be the preferred site), or assigning an overall coverage rating for the region 700. This latter approach could be realized in many ways, too, including a simple sum of all the receive signal powers in the region for each transmitter and comparing the sums, a determination of the percentage of receive areas that fall below a minimum desired signal power for each transmitter and comparing the percentages, etc.

FIG. 8 illustrates a simplified block diagram of a processor on which the methods according to the various embodiments of the invention can be practiced. In this case the processor is a general purpose computer 810 having a central processing unit (CPU) 811 coupled via bus 812 to RAM (random access memory) 813, user I/O (input/output) 814, and memory control unit 815. Memory control unit 815 is in turn coupled to a main memory 816 in which separate databases are stored, e.g., object location data 817 (i.e., the locations of and characteristics of edges and walls in the region), image tree data 818 (including the pruned image tree listing for each calculated location), and calculated signal level data 819. While it is expected that with current technology a general purpose computer will be required to perform the various embodiments of the invention, one skilled in the art will appreciate that as processing powers increase one will be able to utilize any automated digital processor, e.g., ASIC's (application specific integrated circuits), DSP's (digital signal processors) and the like.

A further embodiment of the invention, calculating optimal diversity antenna placement, may now be understood with reference to FIGS. 9–14. This embodiment takes advantage of the fact that after ray-tracing is completed, the rays available at or near the receiver can be added in several ways to calculate the expected average power, or to calculate the local mean power, or the coherent signal power as desired. In each case these values are different kinds of estimates of the power that would actually be received by an antenna, since the environment is only a computer model and does not include every detail of the actual environment. These estimates however can be very good, and can be advantageously used to predict the performance of the actual signal values. The method of adding signals coherently implies that both the amplitude and phase of each ray is known (or can be predicted accurately, given a transmission frequency and propagation distance). Although there generally will be some error in both of these parameters, the resulting coherent addition of rays will still provide a good representation of the actual signals in the environment being modeled.

This embodiment has particular applicability to microcellular environments. Generally, when base antenna locations are selected for large cells, it is sufficient to only specify the height and separation of the diversity base receive antennas since there are no close-by obstructions that will interfere with the field of view of the antennas at a tall site. However for microcell sites, which are often below rooflines, etc., the antenna separation can produce an important engineering trade-off. One possible trade-off is illustrated in FIG. 9, i.e., increasing the separation around a side of a building between two diversity antennas.

When the antennas are within the local clutter, generally two things happen. First, the scattered fields are more randomized near the base antennas producing a sufficiently low statistical correlation coefficient (a quantity typically used to rate the diversity effect that the antennas will be able to use), at a relatively small separation distance. This will give good diversity performance with an antenna separation distance of generally less than 10 wavelengths, whereas a macrocell that is in a more open environment, above the building rooftops, requires an antenna separation distance of perhaps closer to 10–20 wavelengths, depending on the environment, to achieve the same degree of signal decorrelation.

Second, with a microcell located below the rooftop, the path from subscriber to base is much more susceptible to become shadowed by obstructions, thus limiting the potential coverage area due to the site-specific characteristics of the particular cell. If, however, the base antennas are sufficiently well separated, the effect of the shadowing of the signal due to obstructions can be reduced, since at least one base antenna may be in a location that does not experience significant shadowing. This, however, introduces average signal imbalance to the two antennas since one antenna would receive a higher average signal than the other in this condition. A trade-off is thus presented. If branch imbalance exists, the beneficial effect of diversity is reduced; however, by using large antenna separations, the signal coverage in the cell may be improved (even after branch imbalance is considered) in areas where shadowing may have previously limited the coverage for small separations. Thus, by trading-off micro-diversity improvements to Rayleigh fading (i.e., coherent multipath fading produced from localized scattering), improvements can be made by the use of macro-diversity to help mitigate log normal or shadow fading (e.g., blockage or attenuation of the signal due to large obstructions or terrain effects).

The actual signal improvement in a coverage area due to the signal being received at diversity antennas is a combination of the effects of macro-diversity and micro-diversity. Thus, to choose diversity antenna locations for a microcell base station where these two effects are significant would require a careful analysis, including estimates of both multipath fading and shadow fading for the various locations throughout the coverage area. In cases in which digital receivers are used, the effects of delay spread, etc. could be considered as part of the performance criteria. By using a ray-tracing analysis according to the invention, these parameters can now be considered in a computationally efficient manner so as to improve the selection process of the diversity base antenna locations.

Turning now to FIG. 9, two buildings are shown with diversity antennas of a communication unit 820 mounted. In the first example, antennas 821, and 822 are shown on the same side of the roof of a building with a given separation distance. In the second example, antennas 823, and 824 are mounted on different sides of the roof of a building, and their locations are shown by 831 and 839, respectively. Other possible locations for these antennas are shown by 832–838. These points represent examples of possible test locations for these antennas to be used in an analysis to determine an improved mounting location for the antennas based on criteria defined herein (similar, e.g., to the test points shown adjacent to the buildings 710 and 720 of FIG. 7). Generally, one antenna, e.g., 823, may be fixed to point 831, and the other antenna, 824 would be moved to various test locations during the analysis. This method is preferred to save time, although both antennas could be moved if desired. Other test points could also be defined at any location inside or outside the building, or on another building or structure. The goal of the analysis will be to determine an improved set of locations which will give better performance across the desired coverage area.

Referring now to FIG. 10, a plot representing a Rayleigh fading profile is shown. The fading profile from two separate antennas can be seen, each receive signal 841, 842 appearing to be independent of the other, with approximately the same average power in each. The profile describes the variation in the power of the envelope of the signal measured in dB (decibels) as the subscriber moves a short distance, in this case approximately 5–10 wavelengths. Although Rayleigh fading is shown here, other distributions could be considered in the analysis, including Rician (which can look similar in some cases). This signal profile represents the variation that is generally seen in cluttered micocells since the transmitted signal reflects off numerous objects and adds up coherently at the receiver, producing a composite signal that varies in amplitude and phase at the carrier frequency.

FIG. 11 shows the same type of Rayleigh profile, but in which a first branch receive signal 846 (counterpart to 841 in FIG. 10) has less average power than the receive signal 847 of a second branch. This situation is generally referred to as branch imbalance, and is specified by a dB value representing the ratio of the difference of the two powers. Branch imbalance is typically produced in a radio system when one antenna is blocked or shadowed compared to the other, thus introducing additional attenuation in the path of the antenna that is blocked. This affects the average of the power, but does not in general affect the multipath fading distribution of the transmitted signal.

FIG. 12, generally depicted as 850, illustrates the cumulative distribution of a Rayleigh fading process where the probability of the fade depth being at least the number shown on the abscissa is plotted on the Y axis. Curve 851 indicates the result from a single branch Rayleigh fading random process, and would be representative of the multipath fading over much of the cell area. As characteristic of a Rayleigh fading distribution, the probability of a 10 dB fade is approximately 10% and a 20 dB fade is approximately 1%. Curve 855 shows the case of equal branch selection diversity. Although selection diversity is illustrated here, one skilled in the art will readily appreciate how to apply the invention to this or other types of diversity, e.g. max-ratio, equal gain, switched, etc., depending on the system design. As seen in 855, the probability of a 10 dB fade is improved to 1% for selection diversity. For example, with independent branches, the probability of a 10 dB fade will be the probability that both branches fade at least 10 dB at the same time, and this will be given by P(10 dB)selection=P(10 dB)*P(10 dB)=0.1*0.1=0.01=1%. This is a significant improvement, and is the reason that most radio systems make use of diversity.

However, if the diversity branches are not balanced, this improvement is somewhat degraded. Curve 854 represents selection diversity with 3 dB of imbalance between the two branches. Curve 853 has 6 dB of branch imbalance, and 852 has 9 dB of branch imbalance. Even with 9 dB of branch imbalance, there is still worthwhile improvement in the use of diversity as shown.

FIG. 13 shows the cumulative distribution of a Log Normal fading process where the probability of the fade magnitude being less than or equal to the number shown on the abscissa is plotted on the Y axis. The Log Normal fading model is indicative of the composite attenuation in the signal caused for example by shadowing or blocking from clutter in the environment. Typically, as a subscriber moves a distance that is close to the average size of the buildings, the Log Normal fading process becomes decorrelated, giving a user a different value of shadow fading. In a below-roofline urban microcellular environment, the variation of the shadow fading is typically in the range of a standard deviation $\sigma=10$ dB. This implies that the total variation, independent of distance from the site, can vary +/−3 $\sigma$ or −30 to +30 dB. Because this is somewhat more than the variation expected from the Rayleigh fading process, it should be considered in the selection of antenna locations—since the shadowing to one side of a building can be totally different than the shadowing to the other side of a building where the antennas could be mounted.

By using a ray-tracing analysis to calculate the expected propagation path between the subscriber and each base antenna, the effects shown in FIGS. 12 and 13 are properly calculated for each path.

Referring now to FIG. 14, a description of the process steps according to this further embodiment is shown. The process begins in block 861 with the selection of a set of candidate antenna locations for which to analyze the performance of the cell. This is illustrated by locations 831–839 of FIG. 9, which are examples of possible antenna locations. As an example of the selection of antenna locations, the analysis could begin with antennas at locations 831 and 832. After the first run, the analysis could shift the location of the second antenna to 833. This process could continue through all selected locations 831 through 839. To simplify the process the location of the first antenna is preferably not changed (e.g., a predetermined group of combinations being defined, responsive user input parameters, as each combination including location 831), but any combination of locations can be used. If additional site regions are to be compared, the overall process is repeated for an additional set of candidate antenna locations.

Block 862 describes breaking up the cell into small test areas (i.e., a group of locations within the overall coverage area, further narrowed to a smaller set of transmit locations when less than the full group/coverage area is to be tested—such as by excluding locations in building interiors). This can be defined by the user to be a linear drive route, or a square grid of predefined size (e.g., as is illustrated in FIG. 7). By using small test areas, an analysis can be performed for each area, and this will make coverage comparisons easier to make.

Block 863 performs a ray-tracing prediction for each point in the test area, which can be a matrix of points, or a linear segment of points. A separate calculation is made for each candidate antenna location using every point (i.e., the set of transmit locations) in the test area, to arrive at a set of receive signal quality measures. The ray-tracing prediction includes the coherent addition of rays such that the fast fading multipath variations (e.g., see FIG. 10) are obtained from the calculations. This is preferably accomplished by determining each propagation path distance, and using predetermined signal characteristics such as a given frequency and transmit power. While the frequency should remain the same for each cycle, in an alternative embodiment the transmit power is adaptive for each transmit location as to arrive within a set receive signal strength range at the candidate antenna locations, up to a maximum transmit power, thus more closely approximating actual subscriber power control/transmit behavior.

Block 864 evaluates the result of the signal variations as a receiver coupled to the diversity antennas would be able to interpret it for each test area. The quality factor mentioned here is a diversity signal quality measure, which is derived by one of several different types of diversity processing analyses, depending on the receiver diversity design choice. Such preferably includes a statistical cumulative distribution (over the entire cell) of signal quality estimates after the use of diversity is included. For example, where the diversity receiver uses diversity selection, then the greatest of the receive signal quality measures for each transmit location is used; if diversity combining is to be used, all measures would be combined according to the design algorithm. From this process a set of diversity signal quality measures is derived for each combination of candidate antenna locations.

From this set an overall coverage quality measure is determined for the combination of candidate antenna locations. This coverage quality measure is derived using predetermined coverage criteria, which will vary according to the system design choice. For example, in a first alternative a histogram of C/(I+N) (carrier to interference plus noise) ratio is generated, using a selected I+N value for the combination. From this histogram an overall coverage rating is determined, e.g., by (1) summing all values, (2) determining a percentage of transmit locations (either in the whole coverage area or within one or more selected range(s) from the antennas) below a set C/I+N ratio, (3) selecting all histogram values having a worse 10% (or other selected)

value, etc. A second alternative includes the use of an algorithm modeling a more complex radio modem to interpret the predicted profiles and generate a quality metric which is proportional to BER (bit error rate) or WER (word error rate) for each profile that is tested. This radio modem analysis is preferably done by simulating the radio by a computer program or by generating a time varying RF (radio frequency) signal that represents that of the predicted signal for a test route, and applying this to a radio from which actual performance can be measured. A third alternative is to select a BER or WER from a curve representing the radio performance as a function of signal level, and for each signal level obtained by the prediction, tabulate the effective result of the cumulative average of the BER or WER of the signal profile.

In Block 865, the cell area can be found in different ways based on the analysis desired by the user. If the analysis includes multiple cells, the coverage of the cell is selected, e.g., as a best server area. This is an area defined by those locations that are best served by that cell where the signal is above a minimum threshold. Thus, the coverage area can include coverage holes, and its size may be dictated by how much signal is at the edge of the cell. If there are no other cells in the analysis, the coverage area can be fixed by the user, or can be calculated based on signal level or C/N (carrier to noise level). After the evaluation is made, the statistics are preferably outputted to a user (e.g., printed out) for the given combination of base antenna locations.

In Block 866, this process is repeated for each set of possible base antenna locations, and the results for each combination compared. The combination with the greatest coverage quality measure are then output in block 867, e.g., by suitable output to a user, or storage of the locations of the optimal antenna combination.

Thus, it will be apparent to one skilled in the art that there has been provided in accordance with the invention, a method and apparatus of image tree generation, pruning, and antenna placement that fully satisfies the objectives and advantages set forth above. While the invention has been described in conjunction with specific embodiments thereof, it is evident that many alterations, modifications, and variations will be apparent to those skilled in the art in light of the foregoing description. Accordingly, the invention is intended to embrace all such alterations, modifications, and variations within the spirit and scope of the appended claims.

We claim:

1. A method of determining where to locate diversity antennas of a communication unit, comprising in an automated digital processor:

(a) selecting a set of candidate antenna locations from a group of locations within a coverage area;

(b) selecting a set of transmit locations from the group of locations;

(c) determining a set of receive signal quality measures for each candidate antenna location, of the set of candidate antenna locations, by ray tracing between said each candidate antenna location and the set of transmit locations based on predetermined signal characteristics;

(d) determining a set of diversity signal quality measures, for each combination of candidate antenna locations from a predetermined group of combinations of the candidate antenna locations, by diversity processing each set of receive signal quality measures of all candidate antenna locations of said each combination; and (e) determining a coverage quality measure for each set of diversity signal quality measures of said each combination.

2. The method of claim 1, further comprising:

(f) comparing each coverage quality measure to determine a first combination of said each combination having a greatest coverage quality measure, and storing corresponding antenna locations of said first combination.

3. The method of claim 1, wherein step (e) further comprises determining a coverage quality measure for each set of diversity signal quality measures of said each combination based on at least one predetermined coverage criteria.

4. The method of claim 1, wherein step (e) further comprises determining a coverage quality measure for each set of diversity signal quality measures of said each combination based on predetermined coverage criteria comprising a predetermined interference level and minimum C/I (carrier to interference) level, wherein the set of receive signal quality measures is a set of estimated receive signal strengths, and the coverage quality measure is determined by each measure of the set of diversity signal quality measures being divided by the predetermined interference level to form a set of C/I measures, and comparing the set of C/I measures with the minimum C/I level to output a set of low-signal locations of the set of transmit locations and corresponding low-signal C/I measures as the coverage quality measure.

5. The method of claim 1, wherein step (e) further comprises determining a coverage quality measure for each set of diversity signal quality measures of said each combination based on predetermined coverage criteria comprising a predetermined interference level and minimum C/I (carrier to interference) level, wherein the set of receive signal quality measures is a set of estimated receive signal strengths, and the coverage quality measure is determined by each measure of the set of diversity signal quality measures being divided by the predetermined interference level to form a set of C/I measures, and comparing the set of C/I measures with the minimum C/I level to determine a set of low-signal locations of the set of transmit locations, and determining a ratio of low-signal locations to a subset of the set of transmit locations all within a predetermined range of said each combination of candidate antenna locations, said ratio being the coverage quality measure.

6. The method of claim 5, wherein step (e) further comprises determining a coverage quality measure for each set of diversity signal quality measures of said each combination based on predetermined coverage criteria comprising a predetermined interference level, wherein the predetermined interference level includes noise interference.

7. The method of claim 1, wherein the predetermined group of combinations is a group comprising all combinations of a first candidate antenna location with all remaining candidate antenna locations of the set of candidate antenna locations.

8. The method of claim 1, wherein the predetermined signal characteristics comprise a transmit power level and a frequency.

9. The method of claim 8, further comprising repeating steps (a) through (e) for a further frequency to determine a further coverage quality measure for each set of diversity signal quality measures using the further frequency; and (f) determining a first combination of said each combination having a greatest coverage quality measure, the a greatest coverage quality measure being determined from each coverage quality measure and each further coverage quality measure, and storing corresponding antenna locations of said first combination.

10. A method of determining a quality of candidate locations for diversity antennas of a communication unit, comprising:
  (a) providing a known environment and selecting plural combinations of candidate antenna locations and a set of transmit locations;
  (b) measuring, for each candidate of the candidate antenna locations, a respective set of receive signal quality measures for rays between said each candidate and the set of transmit locations; and
  (c) determining, for each combination of the plural combinations of candidate antenna locations, a set of diversity signal quality measures by diversity processing the respective set for each candidate of the candidate antenna locations forming part of said each combination.

11. The method of claim 10, further comprising:
  (d) determining a coverage quality measure for each combination based on each set of diversity signal quality measures.

12. The method of claim 11, comprising performing steps (a) through (d) in an automated digital processor, and further comprising:
  (e) selecting a best combination of the plural combinations based on the coverage quality measure for each combination.

13. The method of claim 12, wherein step (c) comprises measuring based on ray tracing between said each candidate and the set of transmit locations.

14. The method of claim 13, wherein the step of providing the known environment comprises accessing a memory including data about each of plural reflective surfaces and each of plural diffractive surfaces of the known environment, and the step of ray tracing comprises:

(i) determining a first image tree for a first transmit location within the known environment, having a predetermined scope, by:
    (A) determining first order images of the first image tree by determining, for each of the plural reflective surfaces and each of the plural diffractive surfaces, respectively, within the predetermined scope, a first order image and a scope;
    (B) determining second and higher order images of the image tree by repeating step (b)(i), for a predetermined number of reflections and diffractions, such that for each of the plural reflective surfaces and plural diffractive surfaces, respectively, a next order image and a scope of the next order image is determined;
  (ii) selecting a first candidate antenna location and backtracing from the first candidate antenna location using the first image tree to determine each one of plural propagation paths from the first candidate antenna location to the first transmitter source location;
  (iii) determining a signal quality change for said each one of plural propagation paths based on predetermined signal characteristics;
  (iv) determining a first receive signal quality measure at the first candidate antenna location based on the signal quality change for said each one of plural propagation paths; and
  (v) repeating steps (i) through (iv) for each further transmit location of the set of transmit locations to determine further receive signal quality measures, the first and further receive signal quality measures forming a first set of receive signal quality measures for the first candidate antenna location;
  (vi) repeating steps (i) through (v) for each remaining candidate of the candidate antenna locations.

* * * * *